US007685285B2

(12) United States Patent
Yamakoshi et al.

(10) Patent No.: US 7,685,285 B2
(45) Date of Patent: Mar. 23, 2010

(54) METHOD AND APPARATUS FOR MANAGING EXECUTIONS OF A MANAGEMENT PROGRAM WITHIN A DATA PROCESSING SYSTEM

(75) Inventors: Naoki Yamakoshi, Yamato (JP); Hidekazu Fukuda, Yamato (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1018 days.

(21) Appl. No.: 11/392,332

(22) Filed: Mar. 29, 2006

(65) Prior Publication Data

US 2006/0250301 A1 Nov. 9, 2006

(51) Int. Cl.
*G06F 15/173* (2006.01)
(52) U.S. Cl. ........................ 709/226; 709/223; 709/224; 709/225
(58) Field of Classification Search .................. 709/220, 709/221, 226
See application file for complete search history.

(56) References Cited

U.S. PATENT DOCUMENTS

| | | | |
|---|---|---|---|
| 6,038,586 A | 3/2000 | Frye | |
| 6,047,129 A * | 4/2000 | Frye | 709/221 |
| 6,393,101 B1 * | 5/2002 | Barshefsky et al. | 379/9.04 |
| 6,401,238 B1 | 6/2002 | Brown et al. | |
| 6,836,800 B1 * | 12/2004 | Sweet et al. | 709/224 |
| 7,269,757 B2 * | 9/2007 | Lieblich et al. | 714/37 |
| 2005/0097407 A1 * | 5/2005 | Zhang et al. | 714/100 |
| 2007/0021116 A1 * | 1/2007 | Okita et al. | 455/428 |

FOREIGN PATENT DOCUMENTS

| | | |
|---|---|---|
| JP | 08006733 | 1/1996 |
| JP | 08-331275 | 12/1996 |
| JP | 10-333914 | 12/1998 |
| JP | 11-232148 | 8/1999 |
| JP | 2000-029743 | 1/2000 |
| JP | 2001-042966 | 2/2001 |
| JP | 2001-325126 | 11/2001 |

OTHER PUBLICATIONS

Chizuru Doi, "Update the OS into latest version by Windows Update"; Monthly ASCI PC, vol. 6, No. 1 (Jan. 1, 2003); pp. 62-69.

* cited by examiner

*Primary Examiner*—Kenny S Lin
*Assistant Examiner*—Nam Tran
(74) *Attorney, Agent, or Firm*—Dillon & Yudell LLP

(57) ABSTRACT

A management apparatus for managing executions of a management program within an information processing apparatus is disclosed. The management apparatus includes a use state acquisition means, an index value recording means, a time band selection means, and a program execution instruction means. After acquiring a use state of the information processing apparatus, the use state acquisition means quantifies the acquired use state into an index value. The index value recording means then records the index value for a time band. The time band selection means selects a time band where an index value indicates that the information processing apparatus has not been used at or above a predetermined reference rate. The program execution instruction means causes the management program to be executed on the information processing apparatus at the scheduled time band selected by the time band selection means.

9 Claims, 10 Drawing Sheets

Fig. 4

| | | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|---|
| SUNDAY | BUSY RATE | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | OPERATION PROBABILITY | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| MONDAY | BUSY RATE | 0 | 0 | 0 | 0 | 0 | 0 | 0 | 0 | 0.15 | 0.15 | 0.15 | 0.15 | 0.80 | 0.15 | 0.15 | 0.15 | 0.15 | 0.15 | 0.15 | 0.15 | 0.15 | 0.15 | 0.15 | 0.15 |
| | OPERATION PROBABILITY | 0 | 0 | 0 | 0 | 0 | 0 | 0 | 0.15 | 0.80 | 1.00 | 1.00 | 1.00 | 1.00 | 1.00 | 1.00 | 1.00 | 1.00 | 0.90 | 0.80 | 0.60 | 0.40 | 0.20 | 0.10 | 0.05 |
| TUESDAY | BUSY RATE | 0 | 0 | 0 | 0 | 0 | 0 | 0 | 0 | 0.15 | 0.15 | 0.15 | 0.15 | 0 | 0 | 0.15 | 0.15 | 0.15 | 0.15 | 0.15 | 0.15 | 0.15 | 0.15 | 0.15 | 0.15 |
| | OPERATION PROBABILITY | 0 | 0 | 0 | 0 | 0 | 0 | 0 | 0.15 | 0.80 | 1.00 | 1.00 | 1.00 | 1.00 | 1.00 | 1.00 | 1.00 | 1.00 | 0.90 | 0.80 | 0.60 | 0.40 | 0.20 | 0.10 | 0.05 |
| WEDNESDAY | BUSY RATE | 0 | 0 | 0 | 0 | 0 | 0 | 0 | 0 | 0.15 | 0.15 | 0.15 | 0.15 | 0 | 0 | 0.15 | 0.15 | 0.15 | 0.15 | 0.15 | 0.15 | 0.15 | 0.15 | 0.15 | 0.15 |
| | OPERATION PROBABILITY | 0 | 0 | 0 | 0 | 0 | 0 | 0 | 0.15 | 0.80 | 1.00 | 1.00 | 1.00 | 1.00 | 1.00 | 1.00 | 1.00 | 1.00 | 0.90 | 0.60 | 0.40 | 0.20 | 0.10 | 0.05 | |
| THURSDAY | BUSY RATE | 0 | 0 | 0 | 0 | 0 | 0 | 0 | 0 | 0.15 | 0.15 | 0.15 | 0.15 | 0 | 0 | 0.15 | 0.15 | 0.15 | 0.15 | 0.15 | 0.15 | 0.15 | 0.15 | 0.15 | 0.15 |
| | OPERATION PROBABILITY | 0 | 0 | 0 | 0 | 0 | 0 | 0 | 0.15 | 0.80 | 1.00 | 1.00 | 1.00 | 1.00 | 1.00 | 1.00 | 1.00 | 1.00 | 0.90 | 0.80 | 0.60 | 0.40 | 0.20 | 0.10 | 0.05 |
| FRIDAY | BUSY RATE | 0 | 0 | 0 | 0 | 0 | 0 | 0 | 0 | 0.15 | 0.15 | 0.15 | 0.15 | 0.80 | 0.15 | 0.15 | 0.15 | 0.15 | 0.15 | 0.15 | 0.15 | 0.15 | 0.15 | 0.15 | 0.15 |
| | OPERATION PROBABILITY | 0 | 0 | 0 | 0 | 0 | 0 | 0 | 0.15 | 0.80 | 1.00 | 1.00 | 1.00 | 1.00 | 1.00 | 1.00 | 1.00 | 1.00 | 0.90 | 0.50 | 0.30 | 0.20 | 0.10 | 0 | 0 |
| SATURDAY | BUSY RATE | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | OPERATION PROBABILITY | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| SUN | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| MON | 0.00 | 0.00 | 0.00 | 0.00 | 0.00 | 0.00 | 0.00 | 0.00 | 0.13 | 0.68 | 0.85 | 0.85 | 0.85 | 0.85 | 0.85 | 0.85 | 0.85 | 0.77 | 0.68 | 0.51 | 0.34 | 0.17 | 0.09 | 0.04 |
| TUE | 0.00 | 0.00 | 0.00 | 0.00 | 0.00 | 0.00 | 0.00 | 0.00 | 0.13 | 0.80 | 0.85 | 0.85 | 0.20 | 0.85 | 0.85 | 0.85 | 0.85 | 0.77 | 0.68 | 0.51 | 0.34 | 0.17 | 0.09 | 0.04 |
| WED | 0.00 | 0.00 | 0.00 | 0.00 | 0.00 | 0.00 | 0.00 | 0.00 | 0.13 | 0.68 | 0.85 | 0.85 | 1.00 | 0.85 | 0.85 | 0.85 | 0.85 | 0.77 | 0.51 | 0.34 | 0.17 | 0.09 | 0.04 | 0.00 |
| THU | 0.00 | 0.00 | 0.00 | 0.00 | 0.00 | 0.00 | 0.00 | 0.00 | 0.13 | 0.68 | 0.85 | 0.85 | 1.00 | 0.85 | 0.85 | 0.85 | 0.85 | 0.77 | 0.68 | 0.51 | 0.34 | 0.17 | 0.09 | 0.04 |
| FRI | 0.00 | 0.00 | 0.00 | 0.00 | 0.00 | 0.00 | 0.00 | 0.00 | 0.13 | 0.68 | 1.00 | 0.85 | 0.20 | 0.85 | 0.85 | 0.85 | 0.85 | 0.77 | 0.43 | 0.26 | 0.17 | 0.09 | 0.00 | 0.00 |
| SAT | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |

(B)

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| SUN | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| MON | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 |
| TUE | 0 | 0 | 0 | 0 | 0 | 0 | 0 | 0 | 1 | 0 | 0 | 0 | 1 | 0 | 0 | 0 | 0 | 0 | 0 | 0 | 0 | 0 | 0 | 0 |
| WED | 0 | 0 | 0 | 0 | 0 | 0 | 0 | 0 | 2 | 0 | 0 | 0 | 1 | 1 | 0 | 0 | 0 | 0 | 0 | 0 | 0 | 0 | 0 | 0 |
| THU | 0 | 0 | 0 | 0 | 0 | 0 | 0 | 0 | 1 | 0 | 0 | 0 | 1 | 0 | 0 | 0 | 0 | 0 | 0 | 0 | 0 | 0 | 0 | 0 |
| FRI | 0 | 0 | 0 | 0 | 0 | 0 | 0 | 0 | 1 | 0 | 1 | 0 | 0 | 0 | 0 | 0 | 0 | 0 | 0 | 0 | 0 | 0 | 0 | 0 |
| SAT | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

(C)

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| SUN | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| MON | 0 | 0 | 0 | 0 | 0 | 0 | 0 | 0 | 1 | 5 | 7 | 8 | 10 | 15 | 20 | 2 | 5 | 0 | 0 | 0 | 0 | 0 | 0 | 0 |
| TUE | 0 | 0 | 0 | 0 | 0 | 0 | 0 | 0 | 1 | 15 | 5 | 20 | 95 | 10 | 5 | 10 | 5 | 0 | 0 | 0 | 0 | 0 | 0 | 0 |
| WED | 0 | 0 | 0 | 0 | 0 | 0 | 0 | 0 | 2 | 5 | 20 | 8 | 95 | 20 | 10 | 5 | 10 | 0 | 0 | 0 | 0 | 0 | 0 | 0 |
| THU | 0 | 0 | 0 | 0 | 0 | 0 | 0 | 0 | 1 | 5 | 10 | 10 | 95 | 30 | 10 | 5 | 5 | 0 | 0 | 0 | 0 | 0 | 0 | 0 |
| FRI | 0 | 0 | 0 | 0 | 0 | 0 | 0 | 0 | 1 | 5 | 20 | 8 | 10 | 25 | 10 | 5 | 0 | 0 | 0 | 0 | 0 | 0 | 0 | 0 |
| SAT | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

METHOD AND APPARATUS FOR MANAGING EXECUTIONS OF A MANAGEMENT PROGRAM WITHIN A DATA PROCESSING SYSTEM

CROSS REFERENCE TO RELATED APPLICATIONS

The present application claims benefit of priority under 35 U.S.C. §§120, 365 to the previously filed international patent application number PCT/JP2004/013642 entitled, "Management of Execution of Management Program on Information Processing Apparatus," filed on Sep. 17, 2004 with a priority date of Sep. 30, 2003 based upon Japanese Patent Application No. 2003-342279, both of which are incorporated by reference herein.

BACKGROUND OF THE INVENTION

1. Technical Field

The present invention relates to data processing systems in general, and in particular to a method and apparatus for managing executions of a management program within a data processing system. Still more particularly, the present invention relates to a server computer capable of causing a management program to be executed on a client computer during appropriate hours.

2. Description of Related Art

Local Area Networks (LANs) are commonly found in office environments to facilitate information sharing among office workers. Conventionally, an LAN includes a server computer and multiple client computers. When software on client computers needs to be updated, a network administrator has to install the software in each of the client computers within the LAN, and such task can be very tedious, depending on the number of client computers. Accordingly, a server computer is typically utilized to centrally manage any software that needs to be installed in each client computer within a LAN.

However, certain time bands (or time of day) are not suitable for software installations. For example, during office hours, office workers often need to use client computers, and installation of software in the client computers may interfere with their work. On the other hand, during non-office hours, the client computers are often turned off, and any automated installation of software may become impossible.

Consequently, it would be desirable to provide a server computer capable of causing a management program to be executed on client computers during appropriate hours.

SUMMARY OF THE INVENTION

In accordance with a preferred embodiment of the present invention, a management apparatus for managing executions of a management program within an information processing apparatus includes a use state acquisition means, an index value recording means, a time band selection means, and a program execution instruction means. The use state acquisition means acquires a use state of the information processing apparatus and quantifies the acquired use state into an index value. The index value recording means then records the index value for a time band (or time of day). The time band selection means selects a time band where an index value indicates that the information processing apparatus has not been used at or above a predetermined reference rate, as a scheduled time band where execution of a management program on the information processing apparatus is scheduled. The program execution instruction means causes the management program to be executed on the information processing apparatus at the scheduled time band selected by the time band selection means.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 4 is a diagram showing a use state;

FIG. 6a shows an example of the data structure of an index value;

FIGS. 6b and 6c are examples of the processing performed by a time band selection means;

DETAILED DESCRIPTION OF A PREFERRED EMBODIMENT

Figure 1:
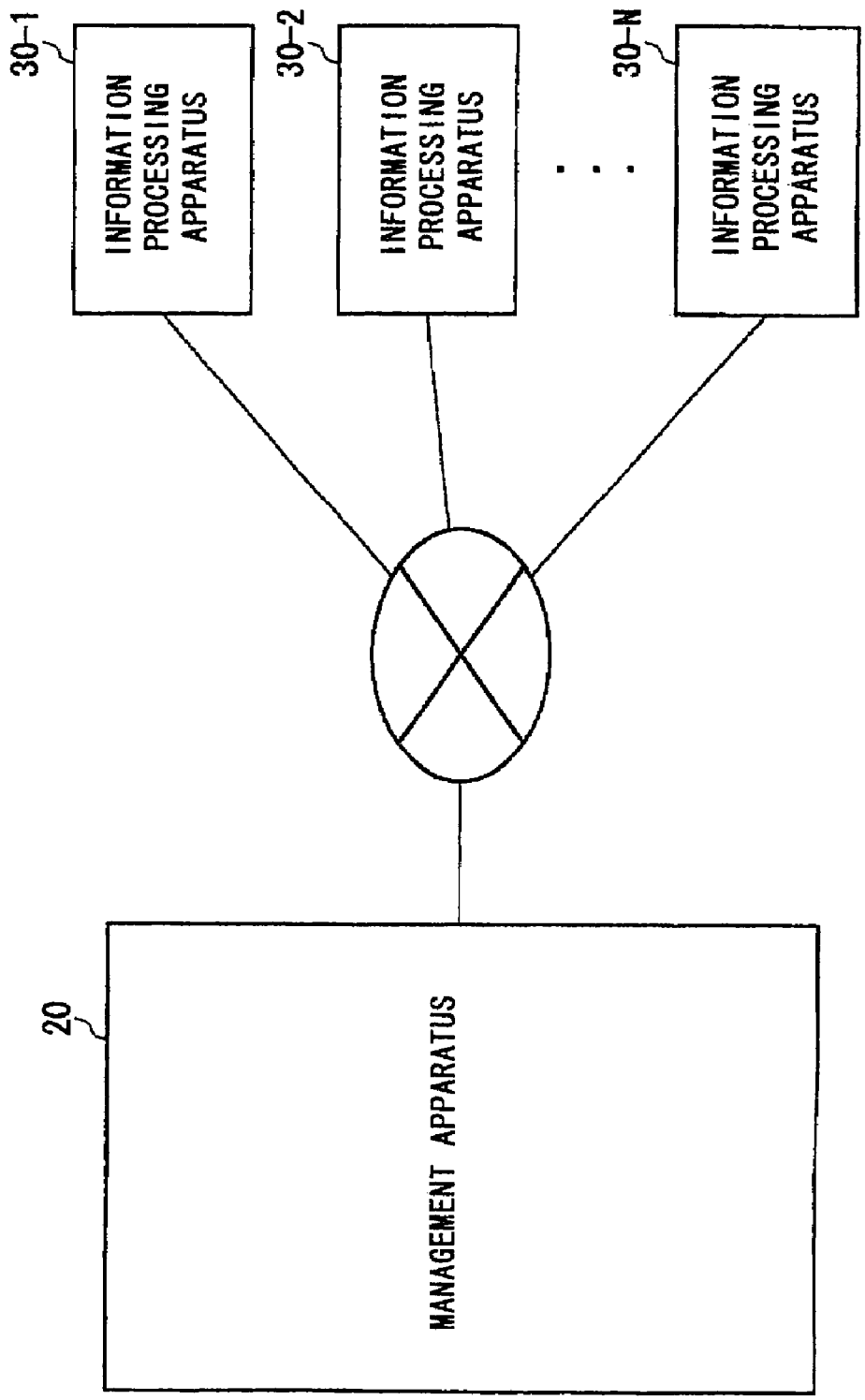
FIG. 1 is a block diagram of a computer network in which a preferred embodiment of the present invention is incorporated.

Referring now to the drawings and in particular to FIG. 1, there is depicted a computer network in which a preferred embodiment of the present invention is incorporated. As shown, a computer network 10 is provided with a management apparatus (i.e., a server computer) 20, and information processing apparatuses (i.e., client computers) 30-1 to 30-N connected to management apparatus 20 via a network. Management apparatus 20 is intended to cause information processing apparatuses 30-1 to 30-N to execute a management program for managing information processing apparatuses 30-1 to 30-N at an appropriate time band (or time of day) that will not interfere with the office workers that utilize information processing apparatuses 30-1 to 30-N during their office hours.

Figure 2:
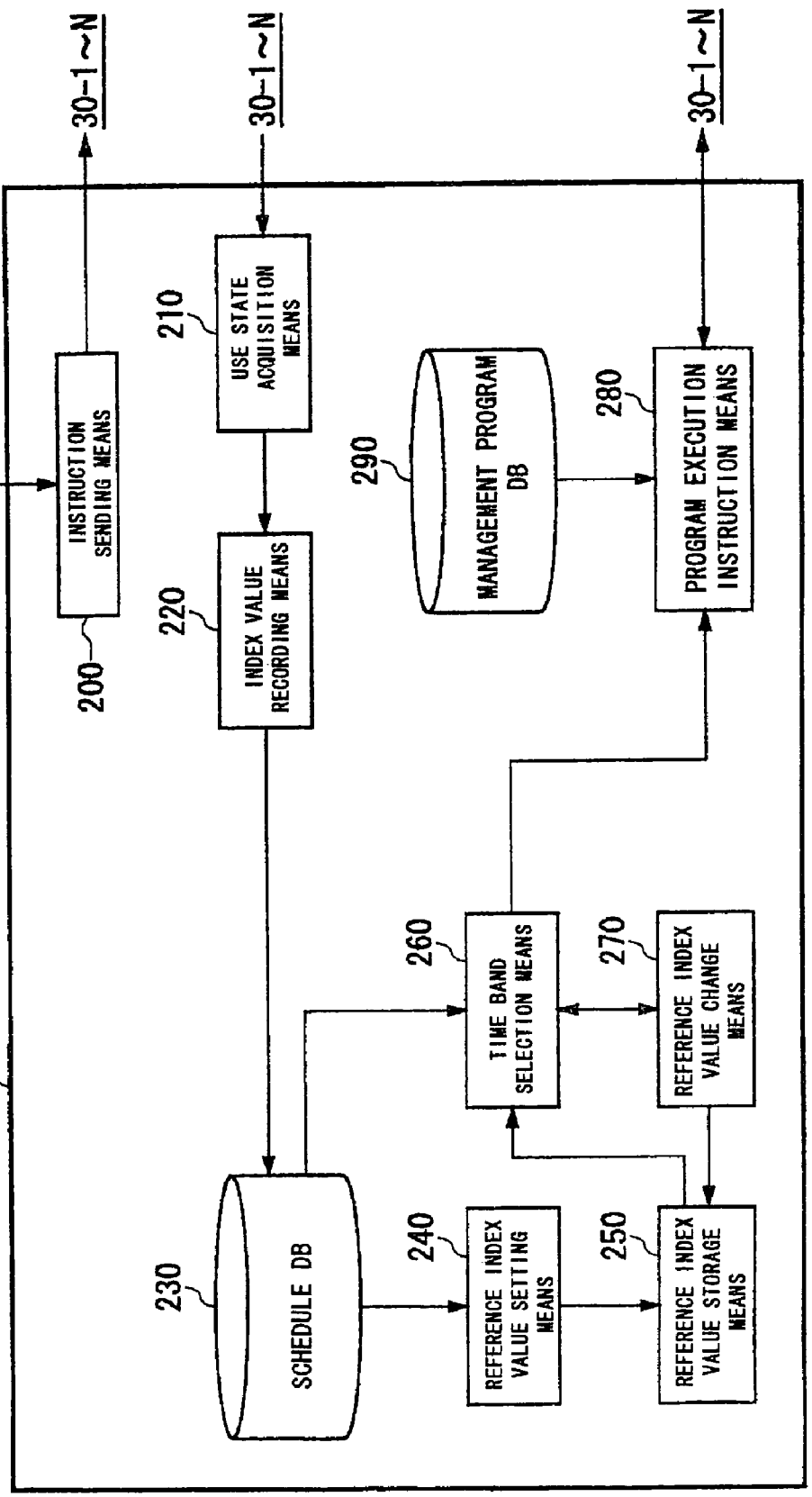
FIG. 2 is a block diagram of a management apparatus within the computer network from FIG. 1, in accordance with a preferred embodiment of the present invention.

With reference now to FIG. 2, there is depicted a block diagram of management apparatus 20, in accordance with a preferred embodiment of the present invention. As shown, management apparatus 20 has an instruction sending means 200, a use state acquisition means 210, an index value recording means 220, a schedule database (DB) 230, a reference index value setting means 240, a reference index value storage means 250, a time band selection means 260, a reference index value change means 270, a program execution instruction means 280 and a management program DB 290.

When an execution of a management program is instructed by a user of management apparatus 20, instruction sending means 200 sends a sending instruction to cause the use state of information processing apparatus 30-1 to be sent to management apparatus 20, to information processing apparatus 30-1. Similarly, instruction sending means 200 also sends the sending instruction to each of information processing apparatuses 30-2 to 30-N. Since other processing performed by management apparatus 20 for information processing apparatus 30-1 are substantially identical to those performed for each of information processing apparatuses 30-2 to 30-N, description on information processing apparatuses 30-2 to 30-N will be omitted.

Use state acquisition means 210 acquires a use state of information processing apparatus 30-1 from information processing apparatus 30-1 as a response to sending instruction. Specifically, use state acquisition means 210 acquires a system use rate indicating the ratio of actual throughput of information processing apparatus 30-1 to the maximum throughput per unit time of information processing apparatus 30-1, from information processing apparatus 30-1 as the use state. Use state acquisition means 210 further acquires a use frequency indicating the frequency of use of an input device of information processing apparatus 30-1, from information processing apparatus 30-1 as the use state. Use state acquisition means 210 also acquires an operation state indicating whether or not information processing apparatus 30-1 is currently in operation, from information processing apparatus 30-1 as the use state.

The system use rate is, for example, the use rate of the central processing unit (CPU) of information processing apparatus 30-1, the use rate of the main memory of information processing apparatus 30-1, the amount of use of a page file of information processing apparatus 30-1, the frequency of access to the hard disk drive of information processing apparatus 30-1 or combination thereof. The input device use frequency may be, for example, the frequency of moving a pointer by a mouse, the amount of movement of the pointer or the frequency of typing a key on a keyboard. Use state acquisition means 210 may acquire information about whether a screen saver has been activated or not or the frequency of the activation as information indicating the use frequency instead of acquiring the use frequency itself.

Then, use state acquisition means 210 quantifies the acquired use state into an index value to indicate the availability of information processing apparatus 30-1. Specifically, use state acquisition means 210 quantifies acquired use state into such an index value as is lower when the system use rate is higher than when the system use rate is lower, lower when the input device use frequency is higher than when the use frequency is lower, and higher when the operation probability of the information processing apparatus 30-1 is higher than when the operation probability is lower. For example, use state acquisition means 210 may calculate the index value in accordance with the following formula with the use of a busy rate, which is a value between 0 and 1 and takes a higher value when the system use rate and the use frequency are higher than when they are lower.

$$\text{index value} = \text{operation probability} \times (1 - \text{busy rate})$$

Instead, use state acquisition means 210 may use the operation probability itself as the index value or may use a value obtained by subtracting the system use rate from 1 as the index value. Alternatively, use state acquisition means 210 may use a value obtained by subtracting the use frequency from a predetermined reference frequency as the index value.

Index value recording means 220 stores the index value quantified by the use state acquisition means 210 in schedule DB 230 for each time band. Reference index value setting means 240 sets a predetermined threshold (for example, 1) for above index value as a reference index value and stores it in reference index value storage means 250. As will be described later, such reference index value can be changed. Reference index value storage means 250 may store the reference index value, for example, for each of the managed information processing apparatuses.

Time band selection means 260 selects a time band where the past index value stored by index value recording means 220 indicates that information processing apparatus 30-1 had not been used at and above a predetermined reference rate, as a scheduled time band where the management program for managing information processing apparatus 30-1 is to be executed. For example, time band selection means 260 selects a time band where the index value recorded by index value recording means 220 is equal to or above the reference index value stored in reference index value storage means 250. When reference index value storage means 250 stores a reference index value for each information processing apparatus, time band selection means 260 selects a reference index value for an information processing apparatus on which the management program is to be executed, from reference index value storage means 250, and selects a time band where the index value recorded by index value recording means 220 is equal to or above the selected reference index value as the scheduled time band.

When the number of information processing apparatuses for which the same scheduled time band is selected by time band selection means 260 reaches a predetermined upper limit, then reference index value change means 270 reduces the reference index value stored in reference index value storage means 250 and causes time band selection means 260 to re-select a scheduled time band. Program execution instruction means 280 acquires the management program stored in management program DB 290 and causes information processing apparatus 30-1 to execute it at the scheduled time band selected by time band selection means 260. Prior to the execution, program execution instruction means 280 may notify information processing apparatus 30-1 that the management program is to be executed. In this case, program execution instruction means 280 starts execution of the management program unless it does not receive an unpermission instruction indicating that execution is not permitted, from information processing apparatus 30-1 within a predetermined period.

The management program stored in management program DB 290 may be, for example, a program for installing a new application program, a program for adding or modifying a function of an application program already installed, or a program for detecting/removing a computer virus that has intruded into an information processing apparatus. Though such a management program is capable of operating in parallel with other programs in an information processing apparatus, it may sometimes decrease the operation speed of the other programs or require re-activation of the information processing apparatus. Management apparatus 20 according to the present embodiment can select a time band appropriate for execution of such a management program.

Figure 3:
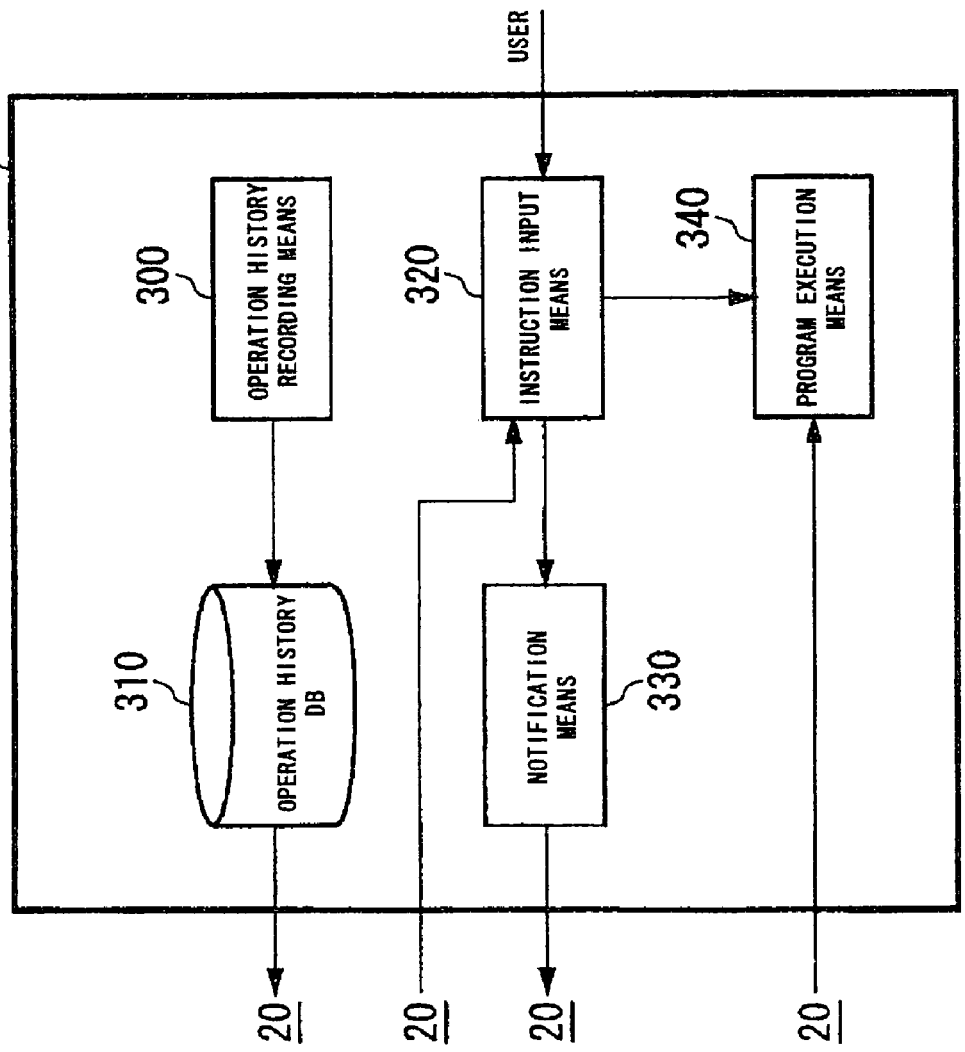
FIG. 3 is a block diagram of an information processing apparatus within the computer network from FIG. 1, in accordance with a preferred embodiment of the present invention.

Referring now to FIG. 3, there is illustrated a block diagram of information processing apparatus 30-1, in accordance with a preferred embodiment of the present invention.

As shown, information processing apparatus 30-1 includes an operation history recording means 300, an operation history DB 310, an instruction input means 320, a notification means 330 and a program execution means 340. Information processing apparatuses 30-2 to 30-N are substantially similar to information processing apparatus 30-1. Operation history recording means 300 records an operation state by periodically recording information to the effect that information processing apparatus 30-1 is operating in operation history DB 310 in association with the time at which information processing apparatus 30-1 is operating. Operation history recording means 300 also detects the system use rate and the input frequency of information processing apparatus 30-1 and stores them in operation history DB 310 in association with the time of the detection.

When receiving a sending instruction from instruction sending means 200, operation history DB 310 sends information indicating the operation state, the system use rate and the input frequency to management apparatus 20. When receiving a notification to the effect that the management program is to be executed, from management apparatus 20, instruction input means 320 causes the user of information processing apparatus 30-1 to input an unpermission instruction to indicate that program execution instruction means 280 is not permitted to cause the management program to be executed. For example, instruction input means 320 may display to the user an input screen for prompting the user to input whether or not execution of the management program may be started.

Then, if the unpermission instruction is inputted, notification means 330 sends an unpermission notification to the effect that execution of management program is not permitted, to management apparatus 20. On the other hand, if the unpermission instruction is not inputted within a predetermined input period, program execution means 340 starts execution of the management program received from management apparatus 20.

With reference now to FIG. 4, there is depicted a block diagram for illustrating a use state acquired by use state acquisition means 210. Use state acquisition means 210 acquires a system use rate, an input device use frequency and an operation state from information processing apparatus 30-1 as the use state. FIG. 4 shows a busy rate determined based on the system use rate and the use frequency acquired by use state acquisition means 210, and an operation probability determined based on the operation state acquired by use state acquisition means 210, for each time band for each day of the week. For example, use state acquisition means 210 acquires such a use state that the busy rate of information processing apparatus 30-1 shows 0.15 and the operation probability shows 1 at the one-hour time band from ten o'clock on Monday. Since the outline of the use state to be acquired by the use state acquisition means 210 for information processing apparatuses 30-2 to 30-N is almost the same as that for information processing apparatus 30-1, descriptions of information processing apparatuses 30-2 to 30-N will be omitted.

The operation probability is a probability that information processing apparatus 30-1 is operating. For example, the operation probability may be a probability that information processing apparatus 30-1 is powered on, a probability that the central processing unit of information processing apparatus 30-1 is ready to execute a command, or a probability that information processing apparatus 30-1 is ready to communicate with the outside. Alternatively, the operation probability may be a probability that information processing apparatus 30-1 is operating within a range where communication from management apparatus 20 is possible via a network. For example, when information processing apparatus 30-1 is operating as a stand-alone, it may be treated as not being operating.

Use state acquisition means 210 calculates the operation probability, for example, in accordance with the following procedure. Use state acquisition means 210 acquires, from operation history recording means 300, the operation state in which operation instruction log information indicating that information processing apparatus 30-1 is operating are associated with the time when information processing apparatus 30-1 is operating. Next, use state acquisition means 210 classifies each of multiple pieces of operation instruction log information according to the time band to which the time associated with the operation instruction log information belongs. Then, use state acquisition means 210 calculates the ratio of the number of pieces of operation instruction log information classified under each time band to the maximum number of pieces of operation instruction log information that can be recorded at the time band, as the operation probability. For example, when operation history recording means 300 records operation instruction log information every fifteen minutes, the maximum number of pieces of operation instruction log information that can be recorded at a one-hour time band is four. In this case, if the number of pieces of operation instruction log information classified under the time band is three, then use state acquisition means 210 calculates an operation probability as 0.75 by dividing three by four.

Figure 5:
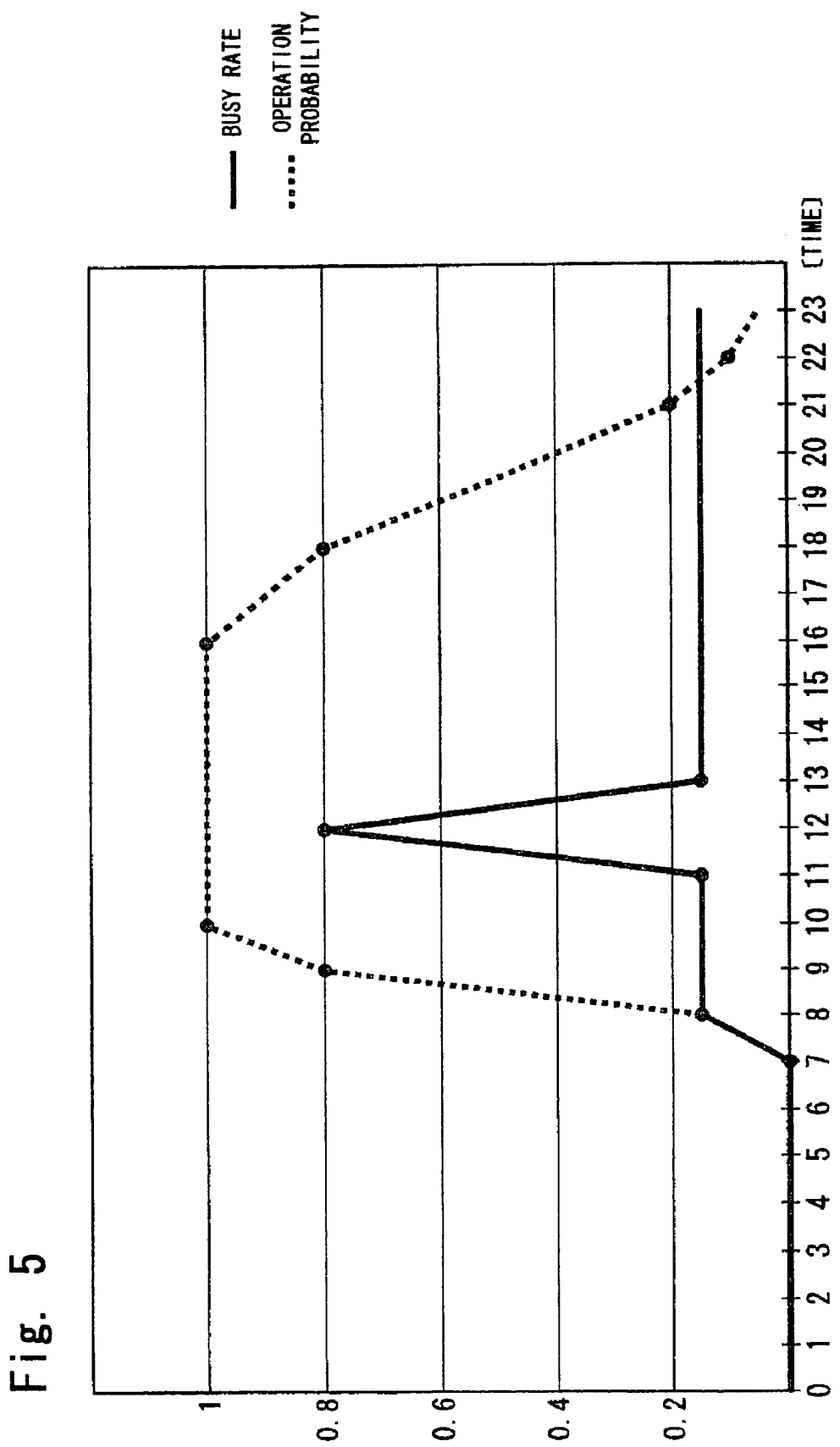
FIG. 5 is a graph showing a use state.

Referring now to FIG. 5, there is depicted a graph showing a use state acquired by use state acquisition means 210. The continuous line indicates the busy rate of information processing apparatus 30-1 at each time band on Monday. The dotted line shows the operation probability of information processing apparatus 30-1 at each time band on Monday. In order to cause the management program to be executed on information processing apparatus 30-1, it is premised that information processing apparatus 30-1 is operating. Therefore, it is desirable that management apparatus 20 causes management program to be executed at a time band where the operation probability of information processing apparatus 30-1 is high. In the example shown in FIG. 5, the operation probability is high at the time band from about nine o'clock to eighteen o'clock, and the possibility that the management program can be executed is high within this time band.

However, if the management program is executed without exception when the operation probability is higher than the reference probability, it may interfere with the work of the user of information processing apparatus 30-1 when the busy rate of information processing apparatus 30-1 is equal to or above a predetermined level. For example, in the example of FIG. 5, the busy rate is high at the time band from about eleven o'clock to about thirteen o'clock, and it is desirable to avoid execution of the management program within this time band. In order to respond to these requests, management apparatus 20 selects a time band where the operation probability is high to some extent and the work of the user is not interfered with, as a scheduled time band where the management program is to be executed, based on the busy rate and the operation probability stored in schedule DB 230.

With reference now to FIG. 6a, there is depicted an example of the data structure of an index value stored in schedule DB 230, in accordance with a preferred embodiment of the present invention. Use state acquisition means 210 calculates an index value for each of information processing apparatuses 30-1 to 30-N, for each time band of each day of the week, as follows:

index value=operation probability×(1−busy rate)

For example, use state acquisition means 210 acquires a use state indicating that the busy rate of information processing apparatus 30-1 is 0.15, and the operation probability of information processing apparatus 30-1 is 0.80 at the one-hour time band from nine o'clock on Monday, as shown in FIG. 4. Accordingly, use state acquisition means 210 calculates an index value as 0.68 by multiplying the operation probability 0.80 by 0.85 obtained by subtracting the busy rate 0.15 from 1.

In FIG. 6a, time bands where the index value shows the maximum value 1 are indicated with continuous lines. These time bands are the most preferable for execution of the management program. Time bands where the index value is 0.7 or above are indicated with dotted lines. These time bands are the second most preferable for execution of the management program. Time bands where the index value is 0.4 or above are indicated with dashed lines.

In the example of FIG. 6a, schedule DB 230 stores an index value for each time band for each day of the week. Instead, schedule DB 230 may store an index value for each time band irrespective of the day of the week or may store an index value for each time band for a weekday and for a holiday separately.

FIGS. 6b and 6c are diagrams for illustrating an example of the processing performed by time band selection means 260. Time band selection means 260 selects a time band where a past index value stored in schedule DB 230 is equal to or above the reference index value stored in reference index value storage means 250, as a scheduled time band where the management program for managing information processing apparatus 30-1 is to be executed. In FIG. 6b, a time band that can be selected by time band selection means 260 as the scheduled time band is denoted by 1. In other words, if the reference index value is 1, the time band selection means 260 can select one hour from twelve o'clock on Tuesday to Thursday, one hour from thirteen o'clock on Thursday or one hour from ten o'clock on Friday, as the scheduled time band.

As shown in FIG. 6c, time band selection means 260 calculates the number of information processing apparatuses the index value of which is equal to or above the reference index value, for each time band for each day of the week, by summing up data in which a selectable scheduled time band is denoted by 1 for each information processing apparatus for each day of the week. Then, time band selection means 260 preferentially selects, for each of the multiple information processing apparatuses, a time band where there are fewer other information processing apparatuses with an index value above the reference index value, from among time bands where the index value is equal to or above the reference index value, as a scheduled time band of the information processing apparatus.

For example, at the time bands of one hour from twelve o'clock on Tuesday, one hour from twelve o'clock on Wednesday, one hour from twelve o'clock on Thursday, one hour from thirteen o'clock on Thursday and one hour from ten o'clock on Friday that can be selected as a scheduled time band in information processing apparatus 30-1, the numbers of information processing apparatuses the index value of which is equal to or above the reference index value are 95, 95, 95, 30 and 20, respectively. Accordingly, the time band selection means 260 preferentially selects the one hour from ten o'clock on Friday as the scheduled time band.

Figure 7:
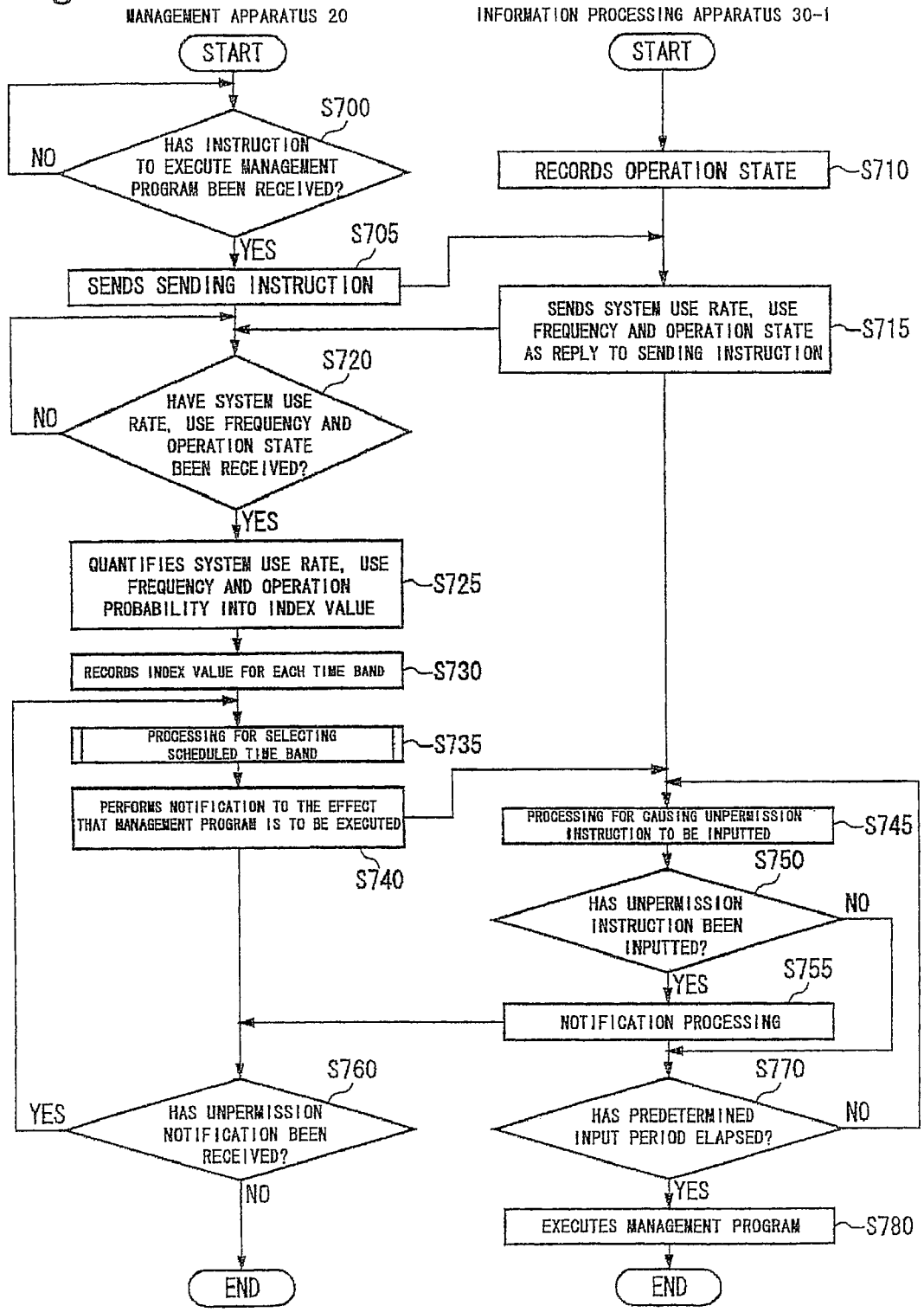
FIG. 7 is a high-level logic flow diagram of a method performed by a management apparatus to cause an information processing apparatus to execute a management program, in accordance with a preferred embodiment of the present invention.

Referring now to FIG. 7, there is a high-level logic flow diagram of a method performed by management apparatus 20 to cause information processing apparatus 30-1 to execute a management program, in accordance with a preferred embodiment of the present invention. When execution of the management program is instructed by a user of management apparatus 20 (S700: YES), instruction sending means 200 sends information processing apparatus 30-1 a sending instruction to cause the use state of information processing apparatus 30-1, for example, the system use rate, the use frequency and the operation probability to be sent to management apparatus 20 (S705).

Operation history recording means 300 records the operation state by periodically recording information to the effect that information processing apparatus 30-1 is operating to operation history DB 310 in association with the time when information processing apparatus 30-1 is operating (S710). Operation history recording means 300 also detects the system use rate and the input frequency of information processing apparatus 30-1 and stores them in association with the time of the detection.

When receiving the sending instruction from management apparatus 20, operation history DB 310 sends information indicating the operation state, the system use rate and the input frequency to management apparatus 20 as a reply to sending instruction (S715). When receiving each of the system use rate, the use frequency and operation state (S720: YES), use state acquisition means 210 quantifies the system use rate, the use frequency and operation state into an index value (S725).

Schedule DB 230 records the index value of information processing apparatus 30-1 for each time band (S730). Time band selection means 260 performs processing for selecting a scheduled time band where execution of the management program for managing information processing apparatus 30-1 is scheduled, based on index value (S735). The details will be described later. Subsequently, program execution instruction means 280 notifies information processing apparatus 30-1 to the effect that management program is to be executed (S740).

When receiving the notification to the effect that the management program is to be executed, from management apparatus 20, instruction input means 320 causes the user of information processing apparatus 30-1 to input an unpermission instruction indicating that program execution instruction means 280 is not permitted to cause the management program to be executed (S745). For example, instruction input means 320 may display to the user an input screen for prompting the user to input whether or not execution of the management program may be started.

Then, if an unpermission instruction is inputted (S750: YES), notification means 330 sends an unpermission notification to the effect that execution of the management program is not permitted, to management apparatus 20 (S755). When receiving unpermission notification (S760: YES), program execution instruction means 280 returns the process to S735 to cause time band selection means 260 to re-select another time band as a scheduled time band. Otherwise, if a predetermined input period has elapsed without the unpermission instruction being inputted (S770: YES), then program execution means 340 starts execution of the management program (S780). That is, program execution instruction means 280 can cause execution of the management program to be started if the unpermission instruction has not been inputted within a predetermined input period.

Figure 8:
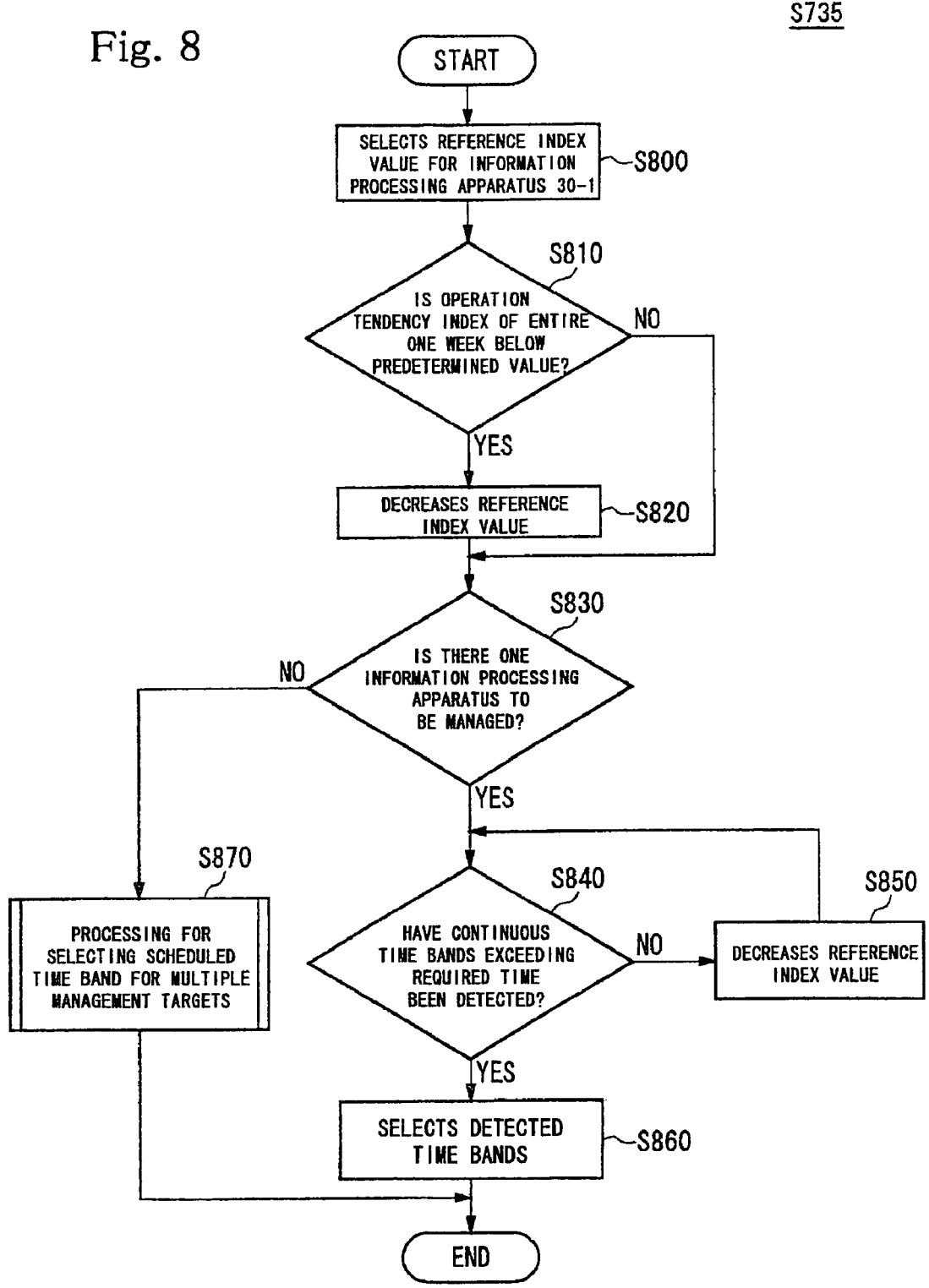
FIG. 8 shows the details of the processing in block S735 from FIG. 7.

With reference now to FIG. 8, there is shown the details of the processing within block S735 of FIG. 7. Time band selection means 260 selects a reference index value for the information processing apparatus 30-1 on which the management program is to be executed (S800). If an operation tendency index, which is the probability of being operating at predetermined multiple time bands, for example, the probability of operating through one entire week is lower than a predetermined value (S810: YES), then the reference index value setting means 240 decreases the reference index value stored in reference index value storage means 250 (S820). Even for such an information processing apparatus that the probability of operating through one entire week is extremely low, a scheduled time band where the management program is to be executed can be quickly and appropriately selected.

When there are multiple information processing apparatuses to be managed (S830: NO), management apparatus 20 performs the processing for selecting a scheduled time band for the multiple targets to be managed (S870). When there are multiple information processing apparatuses to be managed means, for example, the case where it is required to execute a management program for modifying an application program used in multiple information processing apparatuses. The details of the processing will be described later.

On the other hand, when there is one information processing apparatus to be managed (S830: YES), if detecting continuous time bands where the index value is equal to or above the reference index value and which exceed the time required for execution of the management program (S840: YES), then time band selection means 260 selects the detected time bands as the scheduled time band (S860).

On the other hand, if such continuous time bands exceeding the required time cannot be detected (S840: NO), then reference index value change means 270 decreases the reference index value stored in reference index value storage means 250 (S850) and returns the process to block S840.

Figure 9:
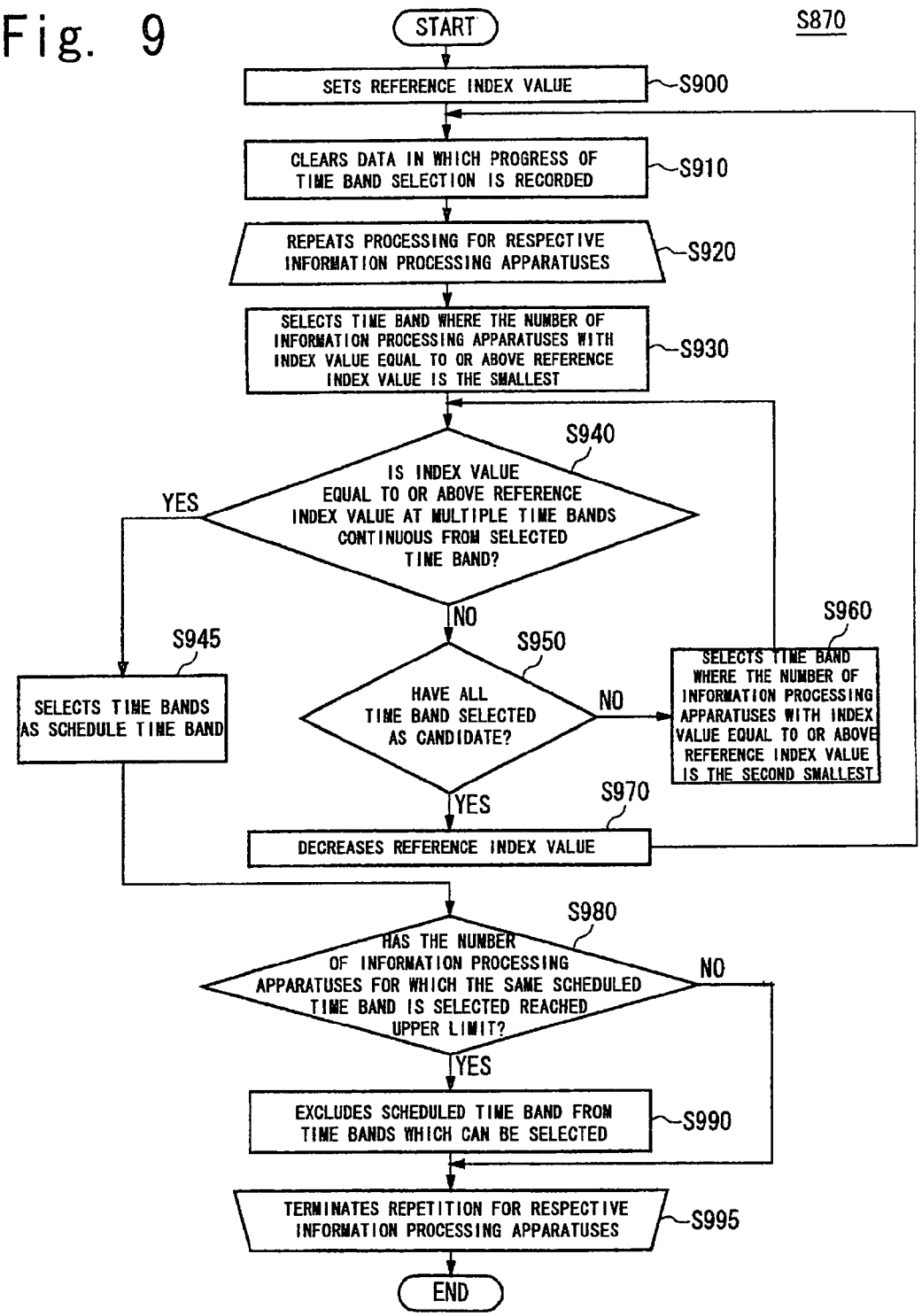
FIG. 9 shows the details of the processing in block S870 from FIG. 8.

Referring now to FIG. 9, there is depicted the details of the processing within block S870 of FIG. 8. Time band selection means 260 sets the reference index value, which is used for comparison with an index value, to a value acquired from reference index value storage means 250 (S900). Time band selection means 260 clears, for each of information processing apparatuses 30-1 to 30-N, the content of a data area for recording the progress of selecting a scheduled time band (S910). Time band selection means 260 sequentially performs the following processing for each of information processing apparatuses 30-1 to 30-N (S920).

The time band selection means 260 selects a time band where the number of information processing apparatuses with an index value equal to or above the reference index value is the smallest, as a candidate time band to be a candidate for a scheduled time band (S930). The time band selection means 260 determines whether or not the index value of the information processing apparatus is equal to or above the reference index value at multiple time bands which are continuous from the candidate time band and exceed the time required for execution of management program (S940). If the index value is smaller than the reference index value (S940: NO), then time band selection means 260 determines whether or not all the time bands have been selected as a candidate time band (S950).

When there is a time band that has not been selected as a candidate time band (S950: NO), time band selection means 260 selects a time band where the number of information processing apparatuses with an index value equal to or above the reference index value is the second smallest (S960), and returns the process to block S940. Otherwise, if all the time bands have been selected as a candidate time band (S950: YES), then reference index value change means 270 decreases the set reference index value (S970) and returns the process to block S910.

If all the time bands have been selected as a candidate time band at block S950 means the case where the time bands with an index value equal to or above the reference index value, longer than the time required for the management program, cannot be selected, or the case where the number of information processing apparatuses on which the management program is to be executed at the same scheduled time band reaches the upper limit. That is, if a time band with an index value equal to or above the reference index value, longer than the time required for the management program cannot be selected, or if the number of information processing apparatuses on which the management program is to be executed at the same scheduled time band reaches the upper limit, then reference index value change means 270 reduces the reference index value and causes time band selection means 260 to re-select a scheduled time band.

Subsequently, if the number of information processing apparatuses for which the same scheduled time band is selected reaches a predetermined upper limit (S980: YES), then time band selection means 260 excludes the scheduled time band from those to be selected (S990). Time band selection means 260 repeats the above processing for respective information processing apparatuses (S995).

As described above, if there are multiple information processing apparatuses to be managed, time band selection means 260 preferentially selects a time band where the number of information processing apparatuses which execute the management program at the same time band is smaller, as a scheduled time band, under the condition that the number of information processing apparatuses which execute the management program at the same time band should not be above the upper limit. As such, it is possible to keep network traffic, which is increased by sending the management program itself or data required for execution of the management program, below a predetermined level. Furthermore, it is also possible to prevent interference with a user's work as much as possible and to select a time band where the operation probability of the information processing apparatus is high.

The procedure shown in FIG. 9 is only an example, and various modification can be made thereto. For example, at block S900, time band selection means 260 sets a reference index value to be compared with an index value to a value acquired from reference index value storage means 250. Alternatively, time band selection means 260 may set the reference index value to 1, which is the maximum value the index value can take. In such a case, time bands can be sequentially selected as a candidate for a scheduled time band by starting from the most appropriate time band.

Figure 10:
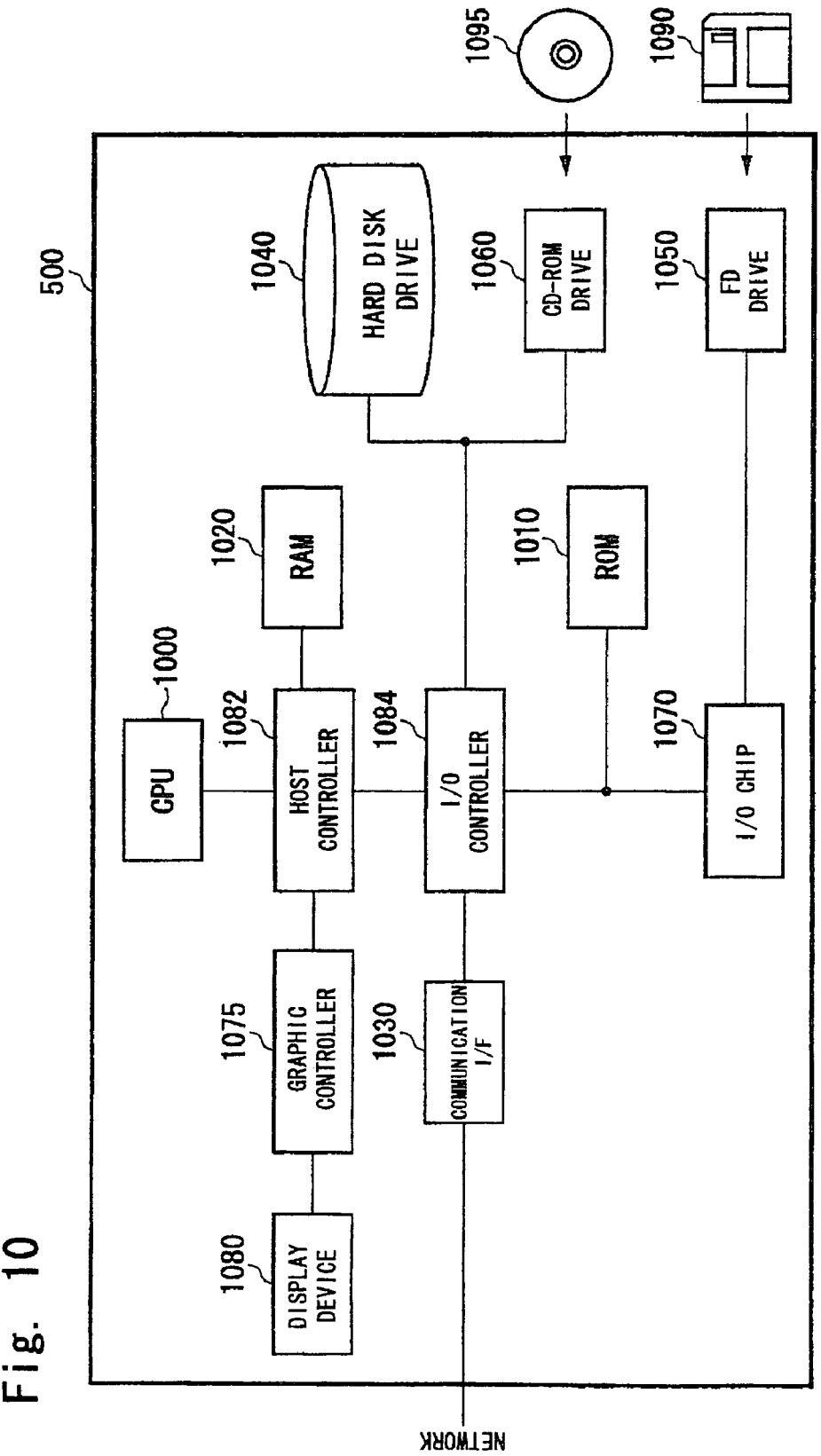
FIG. 10 is a block diagram a computer that can function as a management apparatus or an information processing apparatus, in accordance with a preferred embodiment of the present invention.

With reference now to FIG. 10, there is a block diagram a computer that can function as management apparatus 20 or one of information processing apparatuses 30-1 to 30-N, in accordance with a preferred embodiment of the present invention. As shown, a computer 500 includes a CPU 1000, a RAM 1020, a graphic controller 1075, and a display device 1080 that are mutually connected via a host controller 1082; an input/output (I/O) part having a communication interface (I/F) 1030, a hard disk drive 1040 and a CD-ROM drive 1060 that are connected to host controller 1082 via an I/O controller 1084; and a legacy I/O part having a ROM 1010, a flexible disk drive (FDD) 1050 and an input/output chip 1070 which are connected to I/O controller 1084.

CD-ROM drive 1060 reads a program or data from a CD-ROM 1095, and FDD 1050 exchanges a program or data with a flexible disk 1090. Communication interface 1030 communicates with external devices via a network such as an Ethernet network. ROM 1010 stores a boot program, which is executed by CPU 1000 when computer 500 is activated, and programs dependent on the hardware of computer 500. I/O chip 1070 connects various I/O devices, for example, via a parallel port, a serial port, a keyboard port, a mouse port or the like, in addition to flexible disk 1090.

The program to be installed and executed on computer 500 that functions as management apparatus 20 includes an instruction sending module, a use state acquisition module, an index value recording module, a reference index value setting module, a time band selection module, a reference index value change module and a program execution instruction module. This program may use hard disk drive 1040 as schedule DB 230, reference index value storage means 250 or management program DB 290.

Computer 500 may read the program to be executed on the information processing apparatuses 30-1 to 30-N from a recording medium via I/O chip 1070 or I/O controller 1084, provide it for information processing apparatuses 30-1 to 30-N from communication interface 1030 via a network, and cause it to be executed by information processors 30-1 to 30-N. The program to be provided for and executed on information processing apparatuses 30-1 to 30-N includes an operation history recording module, an instruction input module, a notification module and a program execution module. This program may use hard disk drive 1040 of computer 500 that functions as information processing apparatuses 30-1 to 30-N as operation history DB 310. Since the operation which each module causes management apparatus 20 or information processing apparatuses 30-1 to 30-N to operate is the same as the operation of a corresponding member of management apparatus 20 or the information processing apparatuses 30-1 to 30-N described through FIGS. 1 to 9, description thereof will be omitted.

The programs or modules described above may be stored in an external storage medium. As the recording medium, an optical recording medium such as a DVD and a PD, a magneto-optical recording medium such as an MD, a tape medium, a semiconductor memory such as an IC card or the like can be used in addition to flexible disk 1090 and the CD-ROM 1095. The programs may be provided for computer 500 with the use of a storage device, such as a hard disk and a RAM, provided for a server system connected to a dedicated communication network or the Internet as a recording medium, via the network.

As shown in the embodiment described above, management apparatus 20 records, for each of at least one information processing apparatus, the system use rate, the input device use frequency and the operation probability in the past for each time band. Then, management apparatus 20 selects a time band where the operation probability is equal to or above a predetermined level and the system use rate is equal to or below a predetermined level, as a time band where the management program is to be executed on a day different from the data when the use rate and the other values were recorded, based on the recorded information. As such, it is possible for the administrator of management apparatus 20 to avoid such a situation that execution of the management program must be attempted many times because information processing apparatuses 30-1 to 30-N are not operating and quickly complete the execution of the management program. It is also possible to prevent the execution of the management program from interfering with the work of the users of information processing apparatuses 30-1 to 30-N.

Furthermore, when there are multiple information processing apparatuses to be managed, time band selection means 260 preferentially selects a time band where the number of information processing apparatuses executing the management program at the same time band is smaller, as a scheduled time band. As such, it is possible to avoid such a situation that the management program is redundantly executed at a particular time band and reduce network traffic.

As has been described, the present invention provides a server computer capable of causing a management program to be executed on a client computer during appropriate hours.

While the invention has been particularly shown and described with reference to a preferred embodiment, it will be understood by those skilled in the art that various changes in form and detail may be made therein without departing from the spirit and scope of the invention.

What is claimed is:

1. An apparatus comprising:
   use state acquisition module for acquiring a plurality of use states of an information processing apparatus and for quantifying said acquired use states into corresponding index values, wherein one of said use states is a system use rate, an input device use frequency or an operation state, wherein one of said index values is quantified by operation probability×(1−busy rate)

wherein said operation probability is determined based on said operation state, and said busy rate is determined based on said system use rate and said input device use frequency;
   index value recording module for recording said index values under corresponding hours within each day of a week;
   time band selection module for selecting a time band having one or more of said index values at or above a predetermined reference index value, as a scheduled time band during which a management program within said information processing apparatus is scheduled to be executed; and
   program execution instruction module for causing said management program to be executed on said information processing apparatus at said scheduled time band selected by said time band selection module.

2. The apparatus of claim 1, wherein said system use rate is a ratio of actual throughput of said information processing apparatus to a maximum throughput per unit time of said information processing apparatus.

3. The apparatus of claim 1, wherein said input device use frequency indicates a frequency of usage of an input device of said information processing apparatus.

4. The apparatus of claim 1, wherein said operation state indicates whether said information processing apparatus is operating or not.

5. The apparatus of claim 1, wherein said apparatus further includes reference index value change module for, when said time band selection module is not able to select multiple continuous time bands having said index values at or above said predetermined reference index value and the length of which is longer than time required for execution of said management program, decreasing said predetermined reference index value and for causing said scheduled time band to be re-selected.

6. A method comprising:
   acquiring a plurality of use states of an information processing apparatus and quantifying said acquired use states into corresponding index values, wherein one of said use states is a system use rate, an input device use frequency or an operation state, wherein one of said index values is quantified by operation probability×(1−busy rate)

wherein said operation probability is determined based on said operation state, and said busy rate is determined based on said system use rate and said input device use frequency;
   recording said index values under corresponding hours within each day of a week;

selecting a time band having one or more of said index values at or above a predetermined reference index value, as a scheduled time band during which a management program within said information processing apparatus is scheduled to be executed; and executing said management program on said information processing apparatus at said scheduled time band.

7. The method of claim 6, wherein said system use rate is a ratio of actual throughput of said information processing apparatus to a maximum throughput per unit time of said information processing apparatus.

8. The method of claim 6, wherein said input device use frequency indicates a frequency of usage of an input device of said information processing apparatus.

9. The method of claim 6, wherein said operation state indicates whether said information processing apparatus is operating or not.

* * * * *